United States Patent [19]

Eubank

[11] 3,807,290

[45] Apr. 30, 1974

[54] REVERSE ROOF VENTILATION FOR MOBILE HOME

[76] Inventor: Marcus P. Eubank, P.O. Box 7576, Longview, Tex. 75601

[22] Filed: Nov. 13, 1972

[21] Appl. No.: 306,169

[52] U.S. Cl. .................................. 98/33 R, 98/10
[51] Int. Cl. .............................................. F24f 13/02
[58] Field of Search............. 98/33 A, 10, 33 R, 14, 98/31, 43; 236/49

[56] References Cited
UNITED STATES PATENTS
2,553,881   7/1951   Suttles ............................... 98/31 X

*Primary Examiner*—William E. Wayner
*Attorney, Agent, or Firm*—Wofford, Felsman & Fails

[57] ABSTRACT

Method and apparatus for reducing the heat load on a mobile home characterized by reducing the pressure in the attic portion of the mobile home between the ceiling and the roof and flowing fresh air therethrough when the temperature therein rises above a predetermined and preset maximum. The fresh air picks up the heat in the attic portion and reduces the heat load on the ceiling; and is then discharged exteriorly of the mobile home. The reduced pressure is sufficient to ensure that any convective heat transfer is from the interior of the mobile home into the attic instead of vice versa, but low enough to keep the convective heat transfer small. Also described are the specific steps and the specific apparatus for the preferred embodiment of this invention.

11 Claims, 2 Drawing Figures

REVERSE ROOF VENTILATION FOR MOBILE HOME

BACKGROUND OF THE INVENTION

1. Field of the Invention

This invention relates to method and apparatus for reducing the heat load on a mobile home.

2. Description of the Prior Art

Many approaches have been employed for cooling homes. With the advent of the boom in mobile homes, the problem of severe heat load and the relatively thin insulation in the different panels of the mobile home accentuates the problem of reducing the heat load thereon. If air conditioning is employed, inordinately large units are required with undesirably high costs, because of the generally metallic skin and the relatively thin layers of insulation employed in the mobile home construction. A large portion of the heat load in a mobile home results from the heat coming in through the roof which, in unshaded homes, is bombarded by the heat rays from the sun all day; in contrast to the walls which are subjected to only slanting rays and then for only a part of the day. Ordinarily, the roof of a mobile home is a relatively flimsy structure comprising metallic skin or the like that is unable to support the roof ventilators which have been employed successfully with conventional buildings. Moreover, mobile homes frequently have to be pulled down the highway, under low bridges and the like such that a protruding structure is undesirable and would frequently raise the height so great as to require a detour or removal of the roof ventilator. The roof is separated from the ceiling by a space of a few inches with trusses sparsely disposed therewithin. The insulation which is interposed between the ceiling and the roof has to be so thin as to be less effective than desired in reducing the heat load the desired amount. Moreover, if no louvers are employed in the attic portion of the trailer, there is a tendency for the pressure in the attic portion to increase due to heating from the sun's bombardment. Consequently, there is convection from the attic portion into the interior of the mobile home. This heat has to be removed if the build up in temperature is to be prevented.

Thus, insofar as I am aware, the prior art has not provided a system for reducing the heat load on a mobile home without requiring artificial cooling or the like, with its attendant high cost; and without having roof ventilators or other accessories which required expensive reinforcing of the roof.

Accordingly, it is an object of this invention to provide method and apparatus for economically reducing the heat load on a mobile home without requiring artificial cooling or roof ventilators.

It is a specific object of this invention to provide method and apparatus for reducing the heat load on a mobile home, including preventing the convective heat transfer from the attic portion into the interior of the mobile home and reducing the heat load on the ceiling of the mobile home, all without the expense of an auxiliary cooling system with its attendant high cost.

These and other objects will become apparent from the descriptive matter hereinafter, particularly when taken in conjunction with the drawings.

DESCRIPTION OF PREFERRED EMBODIMENTS

This invention provides method and apparatus for reducing the heat load on a mobile home having intermediate its ceiling and roof a thin attic portion that is permeable to the flow of air longitudinally of the mobile home. The method includes a plurality of steps. First, a fresh air entrance vent is provided in communication with the attic portion. The fresh air entrance vent may comprise a previously installed air louver in an overhang at one end of the mobile home. In any event, it is protected by an overhang to prevent the influx of precipitation, such as rain or snow, into the attic portion or into the interior of the walls of the mobile home. Next, a temperature sensor is disposed in thermal communication with the attic portion and connected with a thermostat such that, responsive to a temperature in the attic portion greater than a predetermined and preset temperature, a powered blower may be turned on. Next, a downcomer vent and a powered blower is connected with the attic portion of the mobile home and vented exteriorly of the mobile home for pulling fresh air into the attic portion to remove heat, pulling the heated fresh air from the attic portion and discharging it exteriorly of the mobile home; without requiring reinforcing of the roof and the installation of a roof ventilator thereon. Thus, when the temperature in the attic portion of the mobile home goes higher than the predetermined and preset temperature, the powered blower is energized, sucking fresh air through the fresh air entrance vent, substantially through the attic portion of the mobile home, downwardly through the duct means and discharging it exteriorly of the mobile home. As will become clearer from the descriptive matter hereinafter, the powered blower is a powerful high speed blower means that is capable of creating a low and critical static differential pressure in the attic portion such that any convective heat transfer, as by flow of air between the interior of the mobile home and the attic portion is low in quantity and is from the interior of the mobile home into the attic portion to prevent convective heat transfer into the interior of the mobile home. Moreover, the downcomer duct is located at a second location removed from the first location at which the louver serving as the fresh air entrance vent is located such that the fresh air is circulated substantially throughout the entire attic portion to pick up the heat and become heated before it is discharged, thereby reducing the radiative, convective and conductive heat load imposed on the ceiling of the mobile home.

Figure 1:
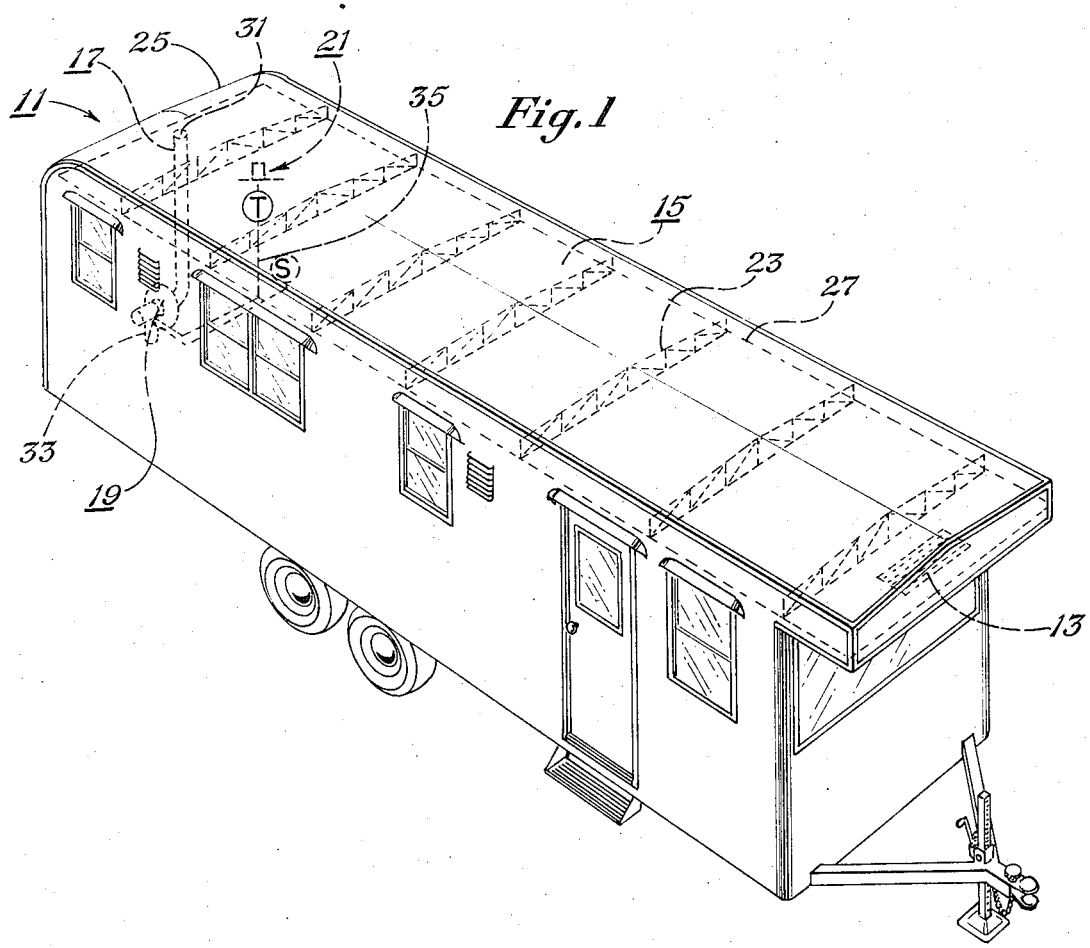
FIG. 1 is an isometric view of a mobile home employing this invention.
Figure 2:
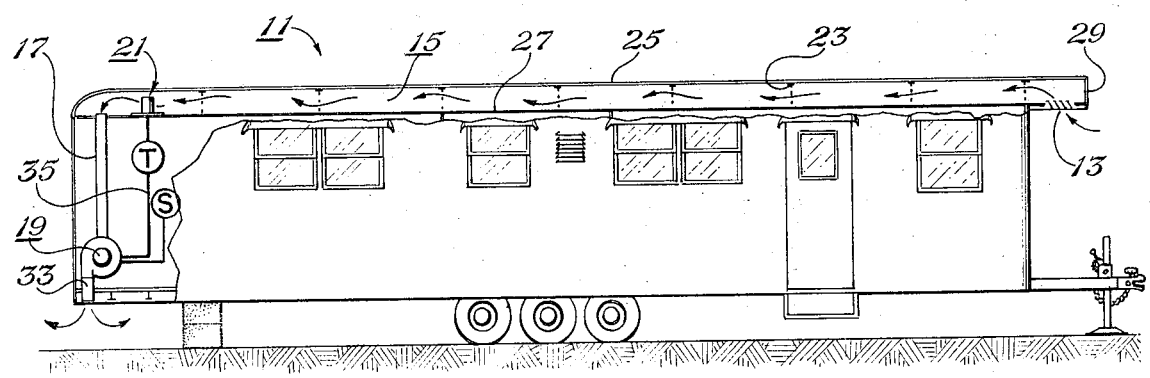
FIG. 2 is a partial cross sectional view, partly schematic, of the embodiment of FIG. 1 employing this invention.

Referring to FIGS. 1 and 2, the apparatus for reducing the heat load on the mobile home 11 comprises at least one fresh air entrance vent 13 in communication with the attic portion 15; a downcomer duct 17; a powered blower 19; and a temperature sensor and thermostat 21. As indicated hereinbefore, the attic portion 15 of the mobile home 11 is permeable to the flow of air therethrough; for example, longitudinally of the mobile home 11 through the open trusses 23 that support the roof 25 and the ceiling 27.

The fresh air entrance vent 13 may comprise one or more air entrance louvers disposed peripherally about the attic portion 15 if desired. Each of the entrance louvers are disposed beneath a weather overhang so as to prevent entrance of precipitation thereinto, as indicated hereinbefore. As illustrated in FIG. 1, a main entrance air vent 13 is disposed at a first location beneath the overhang 29 at the front end of the mobile home 11 without requiring any additional entrance louvers to be installed. If desired, of course, suitable screens may be provided in conjunction with the louver to prevent insects and the like from getting into the attic portion.

The downcomer duct 17 may have any shape desired. For example, the downcomer duct may comprise a conventional duct of rectangular cross section. As illustrated, however, the downcomer duct 17 is shown as cylindrical, since the cylindrical tubular ducts are frequently advantageous in taking advantage of small spaces in mobile homes, as in the corner of a closet. In any event, the downcomer duct 17 is connected with the attic portion at a second location 31 that is removed from the first location and disposed such that the fresh air coming in through the fresh air entrance vent traverses substantially completely throughout the attic portion 15 in flowing to and down the downcomer duct 17. As illustrated, the fresh air comes in through fresh air louver 13 and traverses lengthwise throughout substantially the entire length of the attic portion 15 to pick up the heat and lower the heat load imposed on the ceiling. In the process of flowing through the heated attic portion, the fresh air becomes relatively hot, or heated. The heated fresh air is flowed downwardly through the downcomer duct 17 and discharged exteriorly of the mobile home.

In humid climates, the downcomer duct 17 may be passed downwardly through a closet without insulation to take advantage of the heat therein and keep dry clothes, shoes, leather goods, and other articles, and prevent mildew and fungus from forming thereon.

If desired, the downcomer duct 17 may be provided exteriorly of the mobile home, even though the duct may be exposed by this arrangement.

The powered blower 19 is connected at its suction side with the downcomer duct 17 for creating a reduced pressure in the attic portion 15 and thereby sucking fresh air through the fresh air entrance vent 13, the attic portion 15 and the downcomer duct 17. The powered blower 19 discharges the fresh air that has been heated after flowing through the hot attic exteriorly of the mobile home. As illustrated, a discharge plenum 33 is connected with the discharge side of the powered blower 19 and is connected exteriorly of the mobile home for venting the heated fresh air. Specifically, the discharge plenum 33 is passed through the floor in the embodiment of FIGS. 1 and 2. If desired, it may be passed out the side or rear of the mobile home, either before or after it is passed through the floor. Similarly as described with respect to the downcomer duct 17, the discharge plenum may have any desired cross sectional shape; although it is illustrated as a cylindrical plenum.

As indicated hereinbefore, the static differential pressure must be sufficient to ensure that any convective heat transfer is low and is from the interior of the mobile home into the attic portion. High static differential pressures are undesirable for a multiplicity of reasons. First, they tend to impose unnecessary stress and strain onto the roof 25 and the ceiling 27, or disrupt the ceiling if it is a sectional ceiling, with concomitantly undesirably high rates of flow of the cooler air from inside the mobile home 11 into the attic portion 15. I have found that about one quarter inch of water (one-fourth inch HOH) static differential pressure between the interior of the attic portion 15 and the interior of the mobile home 11 effects a satisfactory reduction in heat transfer interiorly of the mobile home 11 without creating too great a flow of cool air from within the interior of the mobile home 11 into the attic portion 15, or too much stress on the roof and ceiling. If desired, a differential pressure controller may be employed to vary the speed of the powered blower to maintain the proper differential pressure; although this is not essential with a properly designed powered blower.

The powered blower 19 may comprise any of the conventionally available blowers and motors that are capable of moving a relatively high velocity stream of air and creating the critical static differential pressure in the attic portion 15. To obtain the desired relatively high rate of flow of the air, I have found it advantageous to employ high speed squirrel cage blowers driven by electric motors; although staged fans may be employed to do the same job. Both the high speed squirrel blowers and the staged fans, as well as their electric motor drives, are commercially available; for example, from General Electric Company. Consequently, they need not be described in greater detail herein. As will be readily appreciated by the engineer, the volume of air that is required to be drawn through the attic portion 15 will vary depending upon many factors, including the size of the mobile home, the heat load imposed on the mobile home (whether there is shading, partial shading, or no shade); and the size of the fresh air entrance vent or vents 13. The heat picked up by given volume flow rates of air in given attic portions may be calculated using appropriate and well known convective radiative and conductive heat transfer coefficients. Once the desired volume rate of flow of air has been determined in accordance with conventional heat transfer formulas, the representative of the supplying company may be contacted for the size blower and the driving motor that is needed.

The temperature sensor and thermostat 21 is disposed so as to sense the temperature in the attic portion 15. The temperature sensor and thermostat 21 are connected with a suitable source of power; for example, a 12 volt alternating current; and with blower controls by electrical conductors, illustrated by conductor 35, such that the blower is automatically energized when the temperature in the attic portion 15 becomes greater than a predetermined and preset temperature. If desired, the thermostat may be mounted in the ceiling so as to be accessible from the interior of the mobile home, yet sense the temperature in the attic portion and be settable; for example, may be set within a range of from 80°-120° F. On the other hand, a remote temperature sensor may be employed with a factory preset thermostat, as in a conventional furnace such that the blower will automatically come on at some preset temperature; for example, about 85° F as employed in a conventional furnace. In this way, economical temperature sensors and thermostats that are conventionally available may be employed to energize the blower intermittently and when needed, instead of having the blower run continuously.

In operation, a fresh air entrance vent 13 is installed at the first location, if not already preexisting; the downcomer duct 17; the blower 19; and the discharge plenum 33 are installed. The temperature sensor and thermostat 21 is installed and connected with the blower controls. Thereafter, as the attic portion 15 begins to be heated by the rays from the sun and the temperature reaches the preset temperature on the thermostat, the blower 19 is energized to suck fresh air in through the attic portion to pick up the heat and prevent imposition of a high heat load onto the ceiling 25 and, consequently, the interior of the mobile home 11. Ordinarily, the blower 19 may run continuously if the roof 25 of the mobile home 11 is exposed to the sun's rays on a hot sunny day. If, on the other hand, the temperature in the attic portion 15 is reduced below the preset temperature, the blower 19 will be deenergized until the temperature again exceeds the preset temperature.

If desired, a manual bypass or manual switch S, may be provided for the temperature sensor and thermostat, in lieu of an adjustable thermostat, such that the blower 19 runs continuously when the manual switch is energized.

As implied hereinbefore, the fresh air vent may comprise one or more vents that are disposed at any location. Ordinarily, the fresh air vents will be disposed peripherally of the mobile home to prevent having to make an expensive insertion through the roof 25 thereof. If a plurality of fresh air vents are disposed peripherally of the mobile home, as by louvers disposed along the ends and sides, the downcomer duct 17 may be centrally disposed, if desired, in order to sweep the heated air substantially out of the attic portion 15 when the blower 19 is energized.

If desired, an auxiliary blower may be provided to blow fresh air into the attic portion 15 through an entrance vent or to sweep out a dead air space that is not normally swept because of practical location of the downcomer duct 17 and the entrance vents 13.

This invention may be employed alone or in conjunction with auxiliary cooling systems. For example, I have found that relatively large mobile homes employing this invention may be cooled by air conditioning systems that are as much as 25 percent smaller than the air conditioning systems previously required, often saving as much as $20.00 a month in cooling bills.

From the foregoing it can be seen that this invention provides the objects delineated hereinbefore. Specifically, this invention employs a reverse flow of air from an attic portion of a mobile home to blow heated fresh air that has been circulated through the attic portion downwardly and exteriorly of the mobile home, rather than requiring expensive ventilator installations on the roof thereof with the disadvantages attendant thereto, as delineated hereinbefore. By use of the powered blower means and the reverse circulation, a slightly lowered pressure is created in the attic portion such that a critical slight differential pressure exists between the interior of the mobile home and the attic portion to reduce the total heat load, including ensuring that any convective heat transfer between the interior of the mobile home and the attic portion is small and is into the attic portion. Inherently, the fresh air flowing through the attic portion reduces the conductive heat load imposed onto the ceiling of the mobile home, as well as reducing the radiative heat load imposed onto the ceiling.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A method of reducing the heat load on a mobile home having intermediate its ceiling and roof a thin attic portion that is permeable to the flow of air longitudinally of said mobile home, comprising the steps of:
   a. providing a fresh air entrance vent at at least a first location in communication with said attic portion for admitting fresh air thereinto;
   b. effecting a reverse flow of air by energizing a powered blower to create a pressure differential to flow fresh air through said fresh air entrance vent and through substantially all of said attic portion to pick up heat and reduce the heat load imposed on said ceiling, whereby said air becomes heated; and passing the heated air downwardly through a duct means connected with said ceiling and discharging said heated air exteriorly of said mobile home below said attic portion such that the roof, which is ordinarily flimsy, does not have to have an aperture cut thereinto or support a ventilator or the like.

2. The method of claim 1 wherein there is provided the step of detecting the temperature in said attic portion and said blower is energized responsive to a temperature in excess of a predetermined temperature such that said powered blower is energized intermittently and does not run continuously.

3. The method of claim 1 wherein said blower is disposed interiorly of said mobile home and low enough to be readily serviced.

4. The method of claim 3 wherein said blower discharges said relatively heated air through the floor of said mobile home.

5. Apparatus for reducing the heat load on a mobile home having intermediate its ceiling and roof an attic portion that is permeable to the flow of air therethrough, comprising:
   a. at least one fresh air entrance vent disposed at a first location in communication with said attic portion; said fresh air entrance vent being disposed so as to prevent entrance of precipitation into said mobile home;
   b. downcomer duct for effecting reverse flow of air; said downcomer duct being connected with said attic portion at a second location removed from said first location and disposed such that the fresh air coming in through said fresh air entrance vent traverses substantially completely through said attic portion in flowing from said first location to said second location to pick up heat and lower the heat load imposed on said ceiling; said fresh air becoming heated in the process;
   c. a powered blower connected at its suction side with said downcomer duct for sucking said fresh air through said fresh air entrance vent, said attic portion, and said downcomer duct and discharging the heated air exteriorly of said mobile home; and d. temperature sensor and thermostat disposed so as to sense the temperature in said attic portion and connected with said blower such that said blower is automatically energized when said temperature exceeds a predetermined preset temperature.

6. The apparatus of claim 5 wherein said powered blower and fresh air entrance vent are sized so as to provide a sufficient flow of air and to provide between the interior of said mobile home and said attic portion a critical differential pressure that is sufficient to ensure that any air flow is small and is from said interior into said attic portion and not so great as to be physically disruptive and damaging to the ceiling, roof, and the like.

7. The apparatus of claim 6 wherein said critical differential pressure is about one-fourth inch of water.

8. The apparatus of claim 1 wherein said downcomer duct is disposed within said mobile home.

9. The apparatus of claim 8 wherein said powered blower is also disposed within said mobile home and wherein a discharge plenum is connected with the discharge side of said powered blower and connected exteriorly of said mobile home for venting the heated fresh air.

10. The apparatus of claim 5 wherein said fresh air entrance vent comprises a fresh air louver disposed at one end of said mobile home and said second location is disposed at the other end of said mobile home so as to pull fresh air longitudinally through said attic portion.

11. Apparatus for reducing the heat load on a mobile home having intermediate its ceiling and roof an attic portion that is permeable to the flow of air therethrough, comprising:
 a. at least one fresh air entrance vent disposed at a first location in communication with said attic portion; said fresh air entrance vent being disposed so as to prevent entrance of precipitation into said mobile home;
 b. downcomer duct for effecting reverse flow of air; said downcomer duct being connected with said attic portion at a second location removed from said first location and disposed such that the fresh air coming in through said fresh air entrance vent traverses substantially completely through said attic portion in flowing from said first location to said second location to pick up heat and lower the heat load imposed on said ceiling; said fresh air becoming heated in the process;
 c. a powered blower connected at its suction side with said downcomer duct for sucking said fresh air through said fresh air entrance vent, said attic portion, and said downcomer duct and discharging the heated air exteriorly of said mobile home; and
 d. manual switch means for energizing said powered blower for continuous operation.

* * * * *